Nov. 29, 1966 A. H. PARKER ET AL 3,289,183
MULTI-DIRECTIONAL SHIFTING DEVICE
Filed Aug. 21, 1962
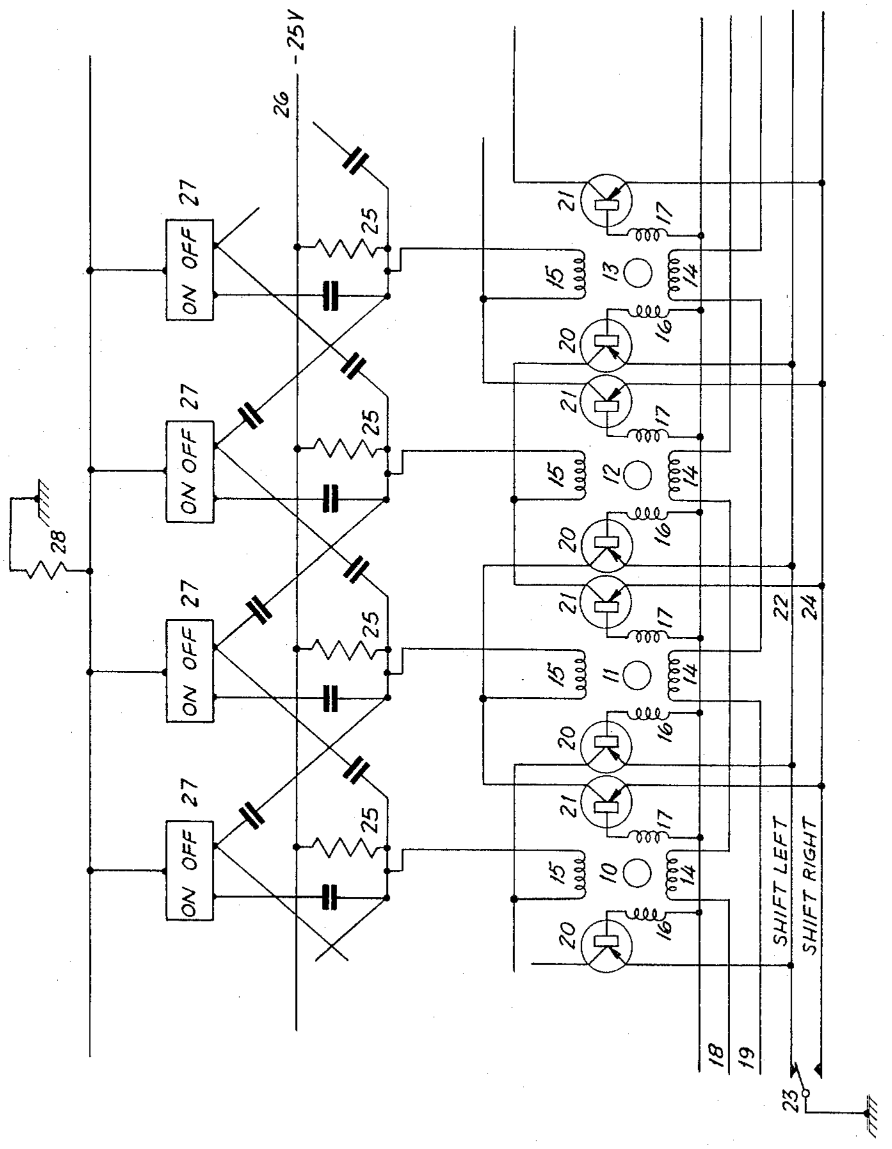
Inventors:
Anthony Hugh Parker
Thomas George Burgess
By [signature]
Attorney United States Patent Office 3,289,183

Patented Nov. 29, 1966

3,289,183

MULTI-DIRECTIONAL SHIFTING DEVICE

Anthony Hugh Parker, Hitchin, and Thomas George Burgess, Stevenage, England, assignors to The De Havilland Aircraft Company Limited, Hatfield, England, a company of Great Britain Filed Aug. 21, 1962, Ser. No. 218,278
7 Claims. (Cl. 340—174)

This invention relates to improvements in information storage devices and is particularly concerned with such devices of the kind (hereinafter referred to as being of "the kind specified") comprising a plurality of bi-stable elements each capable of assuming either one of two conditions and connected in series in a ring in such manner that when one element is caused to change from one condition to the other condition, an adjacent element in the series is caused to change from the other condition to the one condition, the information stored in the device being represented by the position in the ring of the element in said one condition.

In storage devices of the kind specified the element in in said one condition is caused to change its state by means of a voltage or current pulse supplied thereto and in known devices the arrangement has been such that this change of state has produced a corresponding change of state in the adjacent element in one direction only in the ring. Thus, for example, in a ten-element storage device capable of storing the numbers 0 to 9, where the element representing the number 6 is in said one condition and it is desired to change the information in the store to the number 5, it is necessary to supply nine pulses to the device so that successive elements in one direction in the ring assume said one condition until the element representing the number 5 assumes said one condition. It will be appreciated that the element representing the number 5 is next to that representing the number 6 but in the direction opposite to that in which the change of condition is propagated round the ring. Such a change of information in the storage device therefore, requires a relatively long time to accomplish and this is a disadvantage in many applications.

It is an object of the present invention to provide an improved storage device of the kind specified in which the change of one element in the ring from the one condition to the other condition may selectively cause the next adjacent element in either direction in the ring to change from the other condition to the one condition.

According to the present invention, in an information storage device of the kind specified each element in the ring is electrically connected to an input of the adjacent element on either side thereof in the ring to provide an input-pulse thereto in the sense to change the condition of the adjacent elements from the other to the one condition upon the element between the adjacent elements changing from said one to the other condition and means is provided selectively to inhibit one of said input pulses whereby only the selected one of the adjacent elements is caused to change its condition.

According to a preferred embodiment of the invention each bi-stable element of an information storage device of the kind specified is of a ferro-magnetic type and has associated therewith a first input winding to change its condition from the one to the other condition upon the application of a current pulse thereto, a second input winding to change its condition from the other to the one condition upon the application of an input pulse thereto, a first output winding connected through a first inhibiting means to the second input winding of the adjacent element in one direction in the ring, a second output winding connected through a second inhibiting means to the second input winding of the adjacent element in the other direction in the ring and means for selectively rendering one of the inhibiting means operative to prevent one of the adjacent elements changing its condition when the element between adjacent elements changes its condition from the one to the other condition.

Preferably each inhibiting means comprises a transistor which, advantageously, is connected by its base electrode to the associated output winding, by its collector electrode to the associated second input winding and by its emitter electrode to means for rendering the transistor conducting or non-conducting.

The emitter electrodes of the transistors associated with the first output coil of each element are desirably connected together and the emitter electrodes of the transistors associated with the second output coil of each element are similarly connected together and the means for rendering the transistors conducting or non-conducting comprises means for connecting one set of connected emitter electrodes through a low impedance to earth and connecting the other set of connected emitter electrodes through a relatively high impedance to earth.

Conveniently the first input windings of alternate elements are connected in series to receive current pulses from one source and the remaining first input windings are connected in series to receive current pulses from another source so that the current pulse applied to the first input winding of one element to change its state from the one condition to the other is not applied simultaneously to the adjacent elements in the ring.

It is preferred to provide a bi-stable circuit in association with each element which circuit is in the conducting condition when the associated element is in said one condition and is in the non-conducting condition when the associated element is in said other condition, the parameters of such circuits being selected to be such as to cause an electric current to flow through a resistor connected in common to all the circuits the magnitude of which current is a function of the position in the ring of the element in said one condition and which increases in substantially equal steps as the elements change to the one condition in one direction around the ring so that the voltage developed across the resistor varies in a step-wise manner and is a function of the position in the ring of the element which is in the one condition.

Desirably the ferro-magnetic elements are of annular form with the input and output windings thereon and they are conveniently potted.

One embodiment of the present invention will now be described by way of example, reference being made to the accompanying circuit diagram.

The information storage device of this example comprises ten bi-stable elements of the ferro-magnetic type connected in series in a ring, the elements representing by their position in the ring the numbers 0, 1, 2 . . . 9. Only four of these elements are illustrated and these are denoted by the references 10, 11, 12 and 13 respectively. The elements 10 to 13 are annular and have windings thereon as will be described hereafter and are "potted." These elements are capable of assuming one or the other of two conditions and for the sake of convenience one condition will be referred to as the "1" condition corresponding to saturation in the anti-clockwise direction and the other condition will be referred to as the "0" condition corresponding to saturation in the clock-wise direction. The information is stored in the device and is represented by the position in the ring of the element which is in the "1" condition, the other elements being in the "0" condition.

Each element has a first input winding 14 and a second input winding 15 wound thereon together with first and second output windings 16 and 17, respectively. The first input windings 14 of alternate elements are connected in series to a shift line 18 and the remaining first input windings 14 are connected in series to a further shift line 19. Each first output winding 16 is connected to the base electrode of an associated transistor 20, each second output winding 17 is connected to the base electrode of an associated transistor 21. The collector electrode of each transistor 20 is connected to the collector electrode of the transistor 21 associated with the next but one element in one direction in the ring (i.e. to the left in this example) and to the second input winding 15 of the adjacent element in the same direction. The emitter electrodes of the transistors 20 are connected to a common shift left line 22 which can be connected to earth through a switch 23. The collector electrode of each transistor 21 is connected to the collector electrode of the transistor 20 associated with the next but one element in the other direction in the ring (i.e. to the right) and to the second input winding 15 of the adjacent element in the same direction. The emitter electrodes of the transistors 21 are connected to a common shift right line 24 which can be connected to earth through the switch 23.

It will be appreciated that, although the switch 23 is illustrated as a mechanical switch, any suitable switching device may be employed.

The second input winding 15 of each element is connected through a resistor 25 to a common line 26 held at a negative potential, e.g. of —25 volts, and is also electrically connected to an associated bi-stable circuit 27. Each bi-stable circuit has two inputs and is such that when an input pulse is applied to the "ON" input the circuit is switched to the conducting condition and when a pulse is applied to the "OFF" input the circuit is switched to the non-conducting condition. Each second input winding 15 is electrically connected to the "ON" input of the associated circuit 27 and to the "OFF" input of the circuits 27 associated with the adjacent element on either side of the one with which the second input winding is associated. The parameters of the circuits 27 are selected to be such that each draws a current through a common resistor 28 the magnitude of which current is a function of the position in the ring of the associated element. Thus when the element representing the number 1 is in the "1" condition, the associated circuit 27 is conducting and a current of one unit flows in the resistor 28. Similarly when the element representing the number 6 is in the "1" condition a current of six units flows through the resistor 28.

The operation of the device described is as follows:

Assume that the element 11 is in the "1" condition and that this element represents the number 1. If it is desired to change the information stored to the number 2, a current pulse is supplied along the shift line 19 to the first input coil 14 associated with the element 11 and the shift right line is earthed through the switch 23 leaving the shift left line 22 open-circuited. This current pulse has the effect of changing the element 11 to the "0" condition, the remaining elements being unaffected by the current pulse as they are already in the "0" condition and the first input windings 14 being such that a current pulse therein will only change the associated element from the "1" to the "0" condition. The change in condition of the element 11 induces a pulse in both the associated output windings 16 and 17 but that in the winding 16 is inhibited by the transistor 20 which remains non-conducting. The transistor 21 is however conducting due to its emitter electrode being connected to earth and the pulse induced in the second output winding 17 is amplified in the associated transistor 21 and passes through the second input winding 15 associated with the element 12 which represents the number 2. This has the effect of switching the element 12 from the "0" to the "1" condition, of switching the associated circuit 27 to the conducting condition to cause a current of two units to flow through the resistor 28 and of switching the circuit 27 associated with the element 11 to the non-conducting condition.

If it is desired to change the information stored from the number 1 to the number 0 then a voltage pulse is applied to the first input winding 14 of the element 11 as before but in this case the shift left line is earthed and the shift right line has a high impedance to earth so that the transistor 20 conducts and the transistor 21 is non-conducting. The pulse induced in the second output winding 17 is thus inhibited whilst the pulse induced in the first output winding 16 changes the element 10 to the "1" condition, renders the associated circuit 27 conducting and renders the circuit 27 associated with the element 11 non-conducting.

It will be seen that the information in the storage device may be caused to shift left or shift right at will.

It will be appreciated that with the input windings 14 of alternate elements connected to the shift line 18 and the remainder connected to the shift line 19 the effect of a current pulse on one shift line to change the condition of an element will not interfere with the adjacent elements on either side thereof, one of which will be changing its condition.

We claim:

1. An information storage device comprising a plurality of ferromagnetic bistable elements each capable of assuming either of two conditions and connected together in a sequence, the information stored in the device being represented by the position in the sequence of that one of said elements which is in one of said two conditions, each said element being provided with separate corresponding first and second input windings and with separate corresponding first and second output windings and with separate corresponding first and second transistors, the device including an electric circuit for supplying a current pulse to said first input winding of said one element which is in said one condition to change the condition of that said one element to the other of said two conditions and thereby to produce output pulses in said first and second output windings of the said one element, each said first transistor having its collector connected to said second input winding of the next adjacent one of said elements in one direction in said sequence and having its base connected to said corresponding first output winding, each said second transistor having its collector connected to said second input winding of the next adjacent one of said elements in the other direction in said sequence and having its base connected to said corresponding second output winding, whereby said output pulses are transmitted to said second input windings of both of said next adjacent elements to change the condition of those elements from said other to said one condition, the emitter electrodes of all of said first transistors being connected together, and the emitter electrodes of all of said second transistors being connected together and the device including circuit means for selectively rendering one of the said first and the said second transistors non-conducting so as to prevent one of said next adjacent elements from changing its condition when said one element which is in said one condition changes its condition.

2. A device according to claim 1, wherein said circuit means comprises means for connecting one set of said interconnected emitter electrodes through a low impedance to earth and for connecting the other set of said interconnected emitter electrodes through a relatively high impedance to earth.

3. A device according to claim 1, wherein said first input windings of alternate ones of said elements are connected in series to receive said current pulses from one source and the remaining ones of said first input windings are connected in series to receive said current pulses from another source so that said current pluse applied to said first input winding of said one element to change its condition from said one condition to said other condition is not applied simultaneously to adjacent ones of said elements in said sequence.

4. A device according to claim 1, wherein said elements are of annular form with the input and output windings thereon.

5. A device according to claim 1, wherein each of said elements is potted.

6. A device according to claim 1, wherein a separate corresponding bistable circuit is provided in association with each said element which circuit is in the conducting condition when the associated said element is in said one condition and is in the non-conducting condition when the associated said element is in said other condition, the parameters of said circuits being selected to be such as to cause an electric current to flow through a resistor connected in common to all of said bistable circuits the magnitude of which current is a function of the position in the sequence of said one element in said one condition.

7. A device according to claim 6, wherein the parameters of said bistable circuits are selected to be such that the magnitude of said current flowing through said resistor increases in substantially equal steps as said elements change to said one condition in said one direction in said sequence so that the voltage developed across said resistor varies in a stepwise manner and is a function of the position in the sequence of said one element which is in said one condition.

References Cited by the Examiner

UNITED STATES PATENTS

| | | | |
|---|---|---|---|
| 2,785,390 | 3/1957 | Rajchman | 340—174 |
| 3,114,896 | 12/1963 | Carey | 340—174 |
| 3,204,223 | 8/1965 | Crame | 340—174 |

BERNARD KONICK, *Primary Examiner.*

M. S. GITTES, *Assistant Examiner.*